Sept. 7, 1926.  1,599,244

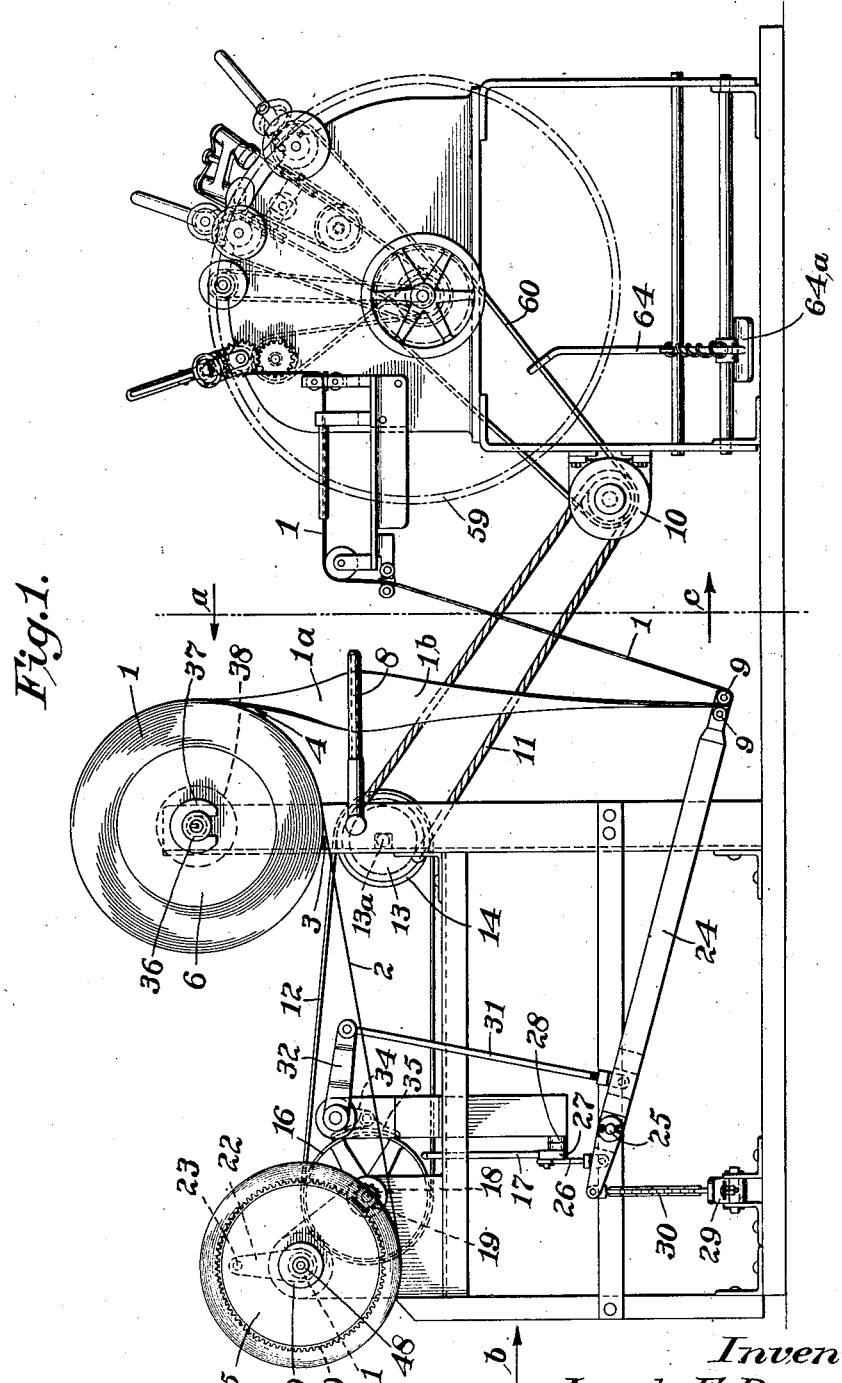

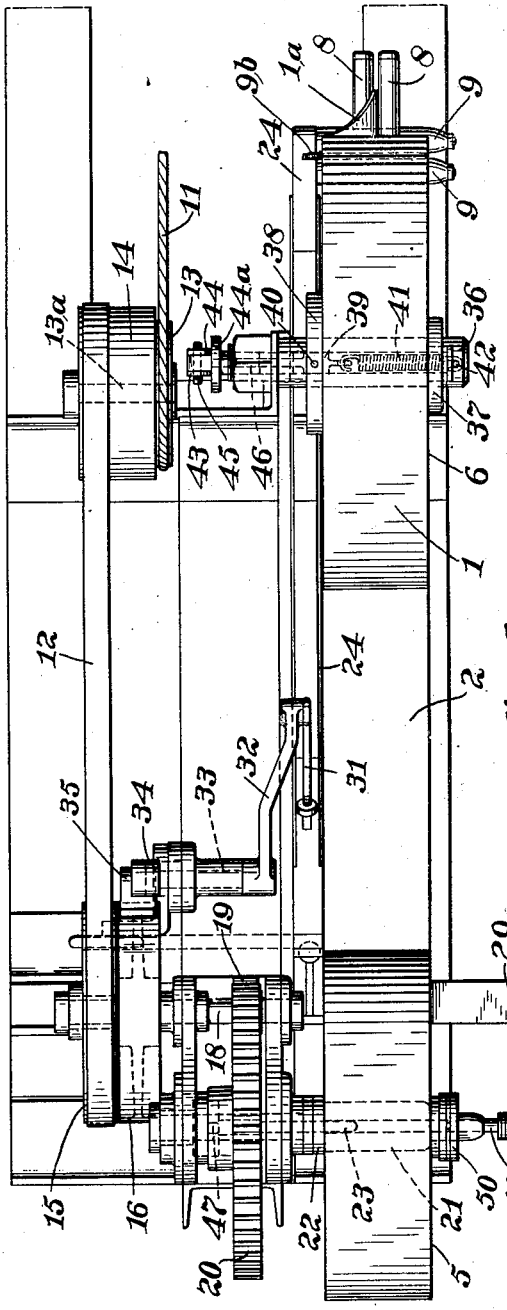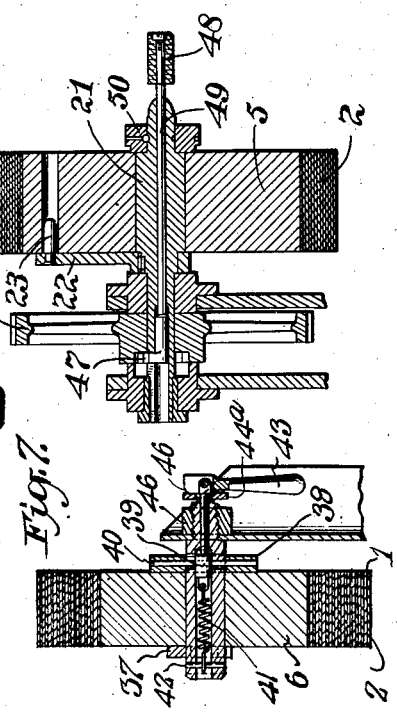

J. E. PERRAULT ET AL

BEAD FLIPPING MACHINE

Filed Oct. 20, 1925   3 Sheets-Sheet 3

Inventors:
Joseph E. Perrault,
Howard G. Ellis,
by their Attys.

Patented Sept. 7, 1926.

1,599,244

UNITED STATES PATENT OFFICE.

JOSEPH E. PERRAULT AND HOWARD G. ELLIS, OF WATERTOWN, MASSACHUSETTS, ASSIGNORS TO HOOD RUBBER COMPANY, OF WATERTOWN, MASSACHUSETTS, A CORPORATION OF MASSACHUSETTS.

BEAD-FLIPPING MACHINE.

Application filed October 20, 1925. Serial No. 63,706.

The said invention relates to improvements in supplying rubberized covering strips to apparatus for covering bead rings such as are used in the manufacture of open bellied pneumatic tire casings, such covered rings having juxtaposed projecting margins, wings, or flips, which constitute the means for anchoring the bead to the tire carcass, and to a method of procedure in connection therewith.

Such strip applying means or apparatus are necessarily operated intermittently to give opportunity for the workman to remove the covered bead core or ring, and supply the fresh or uncovered one, and difficulty has heretofore been experienced in feeding the rubberized strip in a smooth and unwrinkled condition and under requisite tension.

When such a strip is supplied in roll form it is necessarily wound up with an interposed liner, and difficulty has been experienced in the proper separation of the liner and strip.

The present invention aims to provide a method and apparatus by which these objections may be avoided.

With these and other objects in view, as will hereinafter appear the invention includes the novel features of construction and arrangement and combination of parts hereinafter described, the nature and scope of the invention being defined and ascertained by the claims appended hereto.

In the accompanying drawings:—

Figure 1 is a side elevation of a complete machine embodying the said invention.

Fig. 2 is a plan view of one-half of the same.

Figure 3:
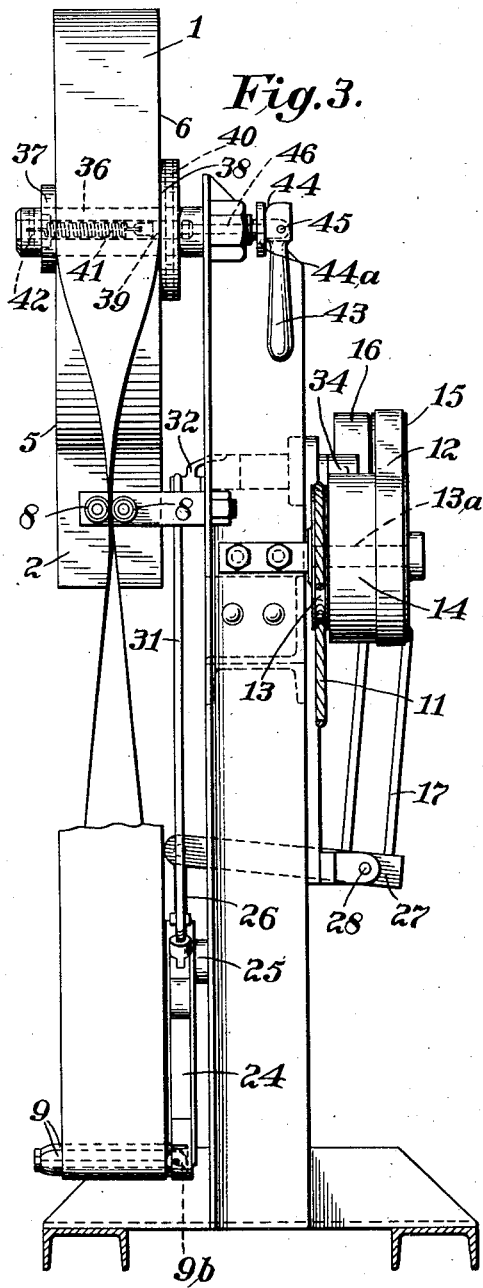

Fig. 3 is an elevation looking from and in the direction of the arrow $a$, Fig. 1.

Figure 4:
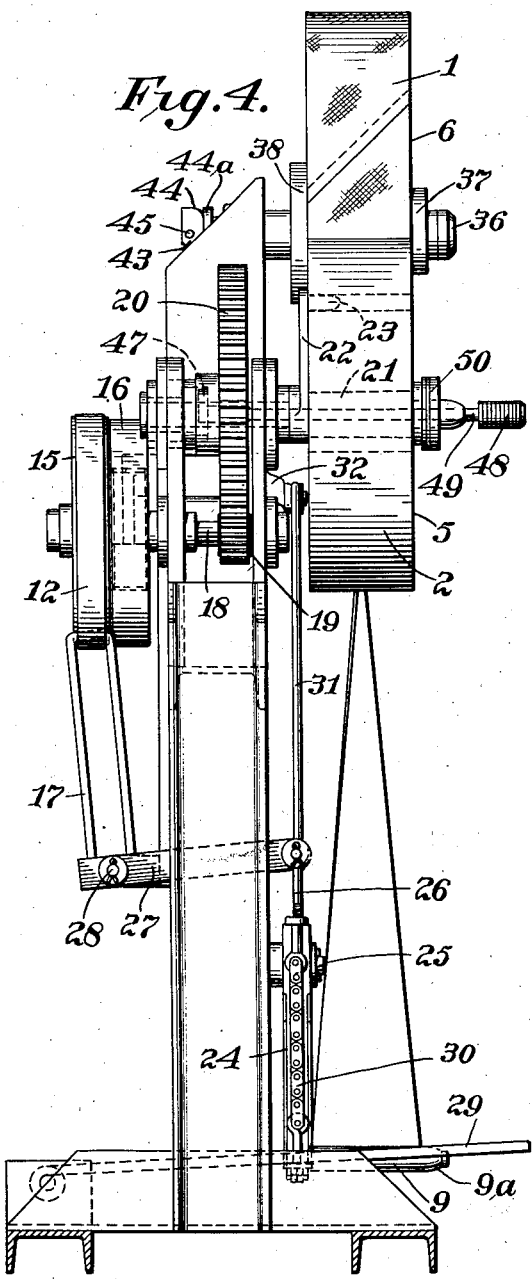

Fig. 4 is an elevation looking in the direction of the arrow $b$, Fig. 1.

Fig. 5 is a sectional detail through the liner spool and its associated mechanism.

Fig. 6 is a detail view of fabric guide rollers.

Fig. 7 is a sectional detail through the supply spool and its associated mechanism.

The bead rings which this machine is adapted to cover are endless rings of customary shape in cross section, and one is indicated in the strip applying means at 59.

The fabric stock used for covering the ring is cut on the bias, which allows it to conform to the different diameters of bead and finished flip, the bias cut strips being joined by overlapping and pressing together adjacent ends to form long strips which are wound on supply spools, as indicated at 1, Fig. 1.

Such a stock sheet we make with one side more sticky or tacky than the other, and it is wound on the spool 6 with the more sticky side inward, being prevented from adhering to itself by being wound on the spool with an interposed liner 2. In the present invention we provide for the separation or pulling away of the liner from the more tacky surface before the corresponding portion of the stock strip is unwound from the spool. To this end the liner is led from the under side of the spool, and is pulled away from the relatively sticky face at 3, the overlying convolution of the stock strip having had its less sticky face separated from the liner at the point 4.

By this arrangement the stock strip has little tendency to adhere to the liner at 4 and is easily separated therefrom, while any pull upon the stock due to the separation of the liner at 3 is resisted by the frictional engagement of the stock with the underlying convolution of liner for approximately three-fourths of the periphery of the roll.

In the present invention reliance is placed on the pull of the liner strip to secure the unwinding action, instead of a pull on the stock strip, such pull at 3 causing the spool to rotate and the stock strip to fall free or be easily removed at 4. After separation from the spool the stock strip is given a quarter turn, as indicated at $1^a$, and passed between a pair of parallel guide rollers 8.

After leaving the guide rollers 8 the stock is given another quarter turn as indicated at $1^b$ to reverse the position of its sticky face, and bring it in position for application to the bead ring, as will hereinafter appear, being passed between parallel guide rollers 9, shown in detail in Fig. 6, having their peripheries spaced apart approximately the thickness of the stock and having their outer ends tapered, as indicated at $9^a$ to facilitate the entrance of the stock, there being a thin roller $9^b$ projecting between the bight of the rollers 9 and serving as an anti-friction guide for the edge of the stock, this arrangement preventing any wrinkling of the stock.

To synchronize the rotation with the operations of the bead ring covering mechanism, and at the same time place a uniform tension on the stock strip, we provide the mechanism which will now be described.

A prime mover 10, which may be conveniently an electric motor, drives the bead covering mechanism including strip drawing and applying rolls, through belt pulley 60 and loose and drive pulleys 61 and 62 respectively, as hereinafter more specifically described, the shifting of the belt being accomplished by belt shifter 64, having a pedal member 64ª, the bead covering mechanism being at rest when the belt is on the loose pulley 61 and being driven when the belt is on the drive pulley 62. The motor 10 also drives the liner winding drum 5 preferably by the interposition of a belt 11 passing around a pulley on the motor shaft and around a pulley 13 carried by a shaft 13ª in the standard which supports the stock spool, which shaft carries a side pulley 14 which, through belt 12 is adapted to drive either the loose pulley 15 or drive pulley 16, see Fig. 2, on shaft 18. As shown in Fig. 2, the belt is in engagement with the loose pulley, which rotates idly, shaft 18 remaining stationary and the unwinding mechanism being at rest.

To automatically set the unwinding mechanism in action when the bead covering mechanism has been started, the following means are provided:—

After the stock has left the guide rollers 8, as above described, it is passed between a pair of rollers 9 carried at the front end of a lever 24 fulcrumed at 25, the stock being led around the outermost roller 9 and thence up and into the covering mechanism. The lever 24 is of such weight that its roller carrying end tends to drop down and form a loop in the stock and hold the same under the proper tension, acting as a floating weighted guide. As soon as the bead covering mechanism is started and the stock sheet is drawn into the bead covering machine by the drawing and covering rollers, the roller carrying end of the lever 24 will be raised, causing the opposite end, through link 26, to operate lever 27 fulcrumed on pin 28 and carrying the belt shifter form 17, whereupon the shaft 18, through gears 19 and 20, will operate to rotate shaft 21. Shaft 21 is designed to removably support the liner spool and carries an arm 22 fast thereon having a pin 23 designed to engage an opening or recess in the liner spool, as shown in Fig. 5, which causes the spool to rotate in unison with the shaft, the spool being held on the shaft by a suitable locking or retaining device, indicated at 50. When the shaft 21 is thus driven, the liner 2 will be pulled from the stock spool, causing the latter to be rotated in a clockwise direction Fig. 1, and the stock to be fed to the covering mechanism.

After a bead ring has been fully covered and the bead covering mechanism stopped by shifting the belt 60, as hereinbefore described, the motor will continue to drive the liner spool and rotate the stock spool until the lever 24 has moved down to the position shown in Fig. 1, at which time the belt 12 will have been shifted back to the loose pulley 15, whereupon the pull upon the liner will cease to travel. The lever 24 is connected by a link 31 to an arm 32 fast on shaft 33, which carries an arm 34 provided with a brake shoe 35 designed to coact with the face of the pulley 16 between the lines of the belt runs, whereby the drive pulley 16 is brought to a stop immediately upon the belt being shifted to the loose pulley.

In addition to the spool 5 being readily removable from its shaft 21 to enable the spool to be removed and an empty one substituted, it is necessary that this spool should be capable of being rotated by hand in starting the winding of the liner thereof, and to provide for this, gear 20 is loose on the shaft and has formed in the rear face thereof one or more slots or recesses adapted to be engaged by a key member 47 designed to be actuated by a handle 48 carried by a rod 49 which projects through an axial bore or passage in the shaft 21 and is connected at its rear end with the key.

The spool 6 of the stock roll, which is likewise made readily removable, is retained on its supporting shaft 36 by means such as a U-shaped member or yoke 37 fitting into slots in the shaft 36. To prevent this spool from over-running and thus feeding a surplus of stock when the unreeling mechanism is suddenly stopped, friction rotating means are provided in the shape of a friction disc 38 on the shaft in rear of the spool, which plate is attached by means of pin 40 passing through a slot in shaft 36, to a plunger 39 slidably mounted in the axial bore of shaft 36, which shaft is a fixed shaft or axle. To this plunger is attached one end of a tension spring 41, the opposite end being secured to the shaft by pin 42 whereby the tension spring draws the friction disc 38 against the back face of the spool.

A hand lever 43, see Fig. 3, is pivoted on a pin 45 at the end of a rod 46 and has a cam face 44 adapted to cooperate with a fixed abutment 44ª. Rod 46 is connected to the plunger 39 and by swinging the handle 43 outward and upward from the position shown in Fig. 3, the friction disc 38 will be drawn out of engagement with the back face of the spool 6, whereby the latter may be rotated by hand for the unwinding of the necessary amount of fabric stock and liner, when a fresh stock roll has been placed in the machine.

In order to facilitate the threading of the fresh stock through the machine when the fresh stock roll has been put in place and after the end of the liner has been secured to the spool 5, we provide means for rotating the said spool 5 from the motor, which, as shown, comprises a foot lever 29 connected to the lever 24 on the left hand side, Fig. 1, of its pivot 25 by a flexible element such as chain 30.

As the bead covering means may be of any desired construction, specific description thereof herein is deemed unnecessary.

Having thus described our invention, what we claim is:—

1. Means for supplying friction fabric to intermittently operating fabric applying machines, comprising a supply roll on which the strip is wound with an interposed liner, power driven means for drawing upon the liner to unwind the roll, and automatic means whereby the unwound portion of the fabric controls the pull of the power means on the liner.

2. Means for supplying friction fabric to intermittently operating fabric applying machines, comprising a supply roll on which the strip is wound with an interposed liner, power driven means for drawing upon the liner to unwind the roll, guide means for forming a loop in the strip after it leaves the supply roll, and a floating element having connections for causing its rise and fall to control the action of said power means.

3. Means for supplying friction fabric to intermittently operating fabric applying machines, comprising a supply roll on which the strip is wound with an interposed liner, power driven means for drawing upon the liner to unwind the roll, guide means for forming a loop in the strip after it leaves the supply roll, a lever fulcrumed on a horizontal axis and having a roller engaging said loop, means whereby the movement of said lever controls the action of said power means, and means for normally operating said lever.

4. Means for supplying friction fabric to fabric applying machines, comprising a supply roll on which the strip is wound with an interposed liner, means for exerting a pull on the liner to rotate the supply roll to unwind the strip, and means for separating the overlying convolution of the strip from the liner at a point adjacent the point where the liner leaves the roll.

5. Means for supplying friction fabric to fabric applying machines, comprising a supply roll on which the strip is wound with an interposed liner, means for exerting a pull on the liner to unwind the roll, guide means for separating the overlying convolution of the strip from the liner, and means for inverting the strip after leaving the supply roll.

6. Means for supplying friction fabric to fabric applying machines, comprising a supply roll on which the strip is wound with an interposed liner, power driven means arranged to unwind the roll by a pull on the liner, said power driven means being so located relative to the supply roll that the liner leaves the roll at a point approximately beneath the axis thereof, strip guiding means for forming a loop in the strip after it is unwound from the supply roll, a weighted floating element engaging said loop, and means whereby the rise and fall of said floating element controls the action of said power means.

7. Means for supplying friction fabric to fabric applying machines, comprising a supply roll on which the strip is wound with an interposed liner, a winding roll to which said liner is attached, power means for rotating said winding roll, guide means for forming a loop in the strip after it leaves the supply roll, a floating element sustained by said loop, means whereby the movement of said floating element controls the movement of said winding drum, and brake means also controlled by the movement of said floating element for checking movement of the winding drum.

8. The hereindescribed method of feeding friction fabric from a supply roll on which it is wound with an interposed liner, which consists in effecting the rotation of the roll in an unwinding direction solely by the pull on the liner.

9. The hereindescribed method which consists in winding upon a supply roll with an interposed liner, a strip of fabric having one side more sticky than the other with the more sticky side outermost, unwinding the roll by a pull upon the liner to separate the liner from the said more sticky side, and withdrawing the overlying strip from the underlying portion of the liner at a point adjacent the point of separation of the liner from the strip.

In testimony whereof we affix our signatures.

JOSEPH E. PERRAULT.
HOWARD G. ELLIS.